United States Patent
Ponnampalam et al.

(10) Patent No.: US 10,177,870 B2
(45) Date of Patent: *Jan. 8, 2019

(54) CODE ASSIGNMENT

(71) Applicant: Facebook, Inc., Menlo Park, CA (US)

(72) Inventors: Vish Ponnampalam, Palo Alto, CA (US); Krishna Gomadam, San Jose, CA (US); Djordje Tujkovic, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 108 days.

This patent is subject to a terminal disclaimer.

(21) Appl. No.: 15/248,378

(22) Filed: Aug. 26, 2016

(65) Prior Publication Data

US 2017/0195145 A1 Jul. 6, 2017

Related U.S. Application Data

(60) Provisional application No. 62/273,993, filed on Dec. 31, 2015.

(51) Int. Cl.
| | |
|---|---|
| *H04J 11/00* | (2006.01) |
| *H04J 13/16* | (2011.01) |
| *H04J 13/00* | (2011.01) |
| *H04L 25/03* | (2006.01) |

(52) U.S. Cl.
CPC ........... *H04J 11/0056* (2013.01); *H04J 13/16* (2013.01); *H04J 13/0014* (2013.01); *H04L 2025/03789* (2013.01); *H04L 2025/03796* (2013.01)

(58) Field of Classification Search
None
See application file for complete search history.

(56) References Cited

U.S. PATENT DOCUMENTS

| | | | |
|---|---|---|---|
| 5,742,593 | A | 8/1998 | Sharony et al. |
| 7,778,270 | B1 | 8/2010 | Zhang et al. |
| 7,920,507 | B2 | 4/2011 | Elliott |
| 8,830,917 | B1 | 9/2014 | Zhang et al. |
| 8,891,592 | B1 | 11/2014 | Zhang et al. |
| 9,332,514 | B2 | 5/2016 | Sorin |

(Continued)

FOREIGN PATENT DOCUMENTS

| | | |
|---|---|---|
| CN | 103763062 | 4/2014 |
| WO | WO2006039936 | 4/2006 |

OTHER PUBLICATIONS

PCT/US2016/067861; PCT International Search Report, dated Mar. 30, 2017.

(Continued)

*Primary Examiner* — Kent K Krueger
(74) *Attorney, Agent, or Firm* — Brian R. Short

(57) ABSTRACT

Apparatuses, methods, and systems of assigning codes are disclosed. One method includes selecting a plurality of available codes, grouping links of a wireless network into a plurality of groups based on connectivity of the links between sectors of the wireless network, characterizing interference between at least one link of a first group of the plurality of groups and at least one link of a second group of the plurality of groups, and assigning at least one code of the plurality of available codes to the first group and at least one other code of the plurality of available codes to the second group based on the characterizing of the interference.

17 Claims, 12 Drawing Sheets

(56) References Cited

U.S. PATENT DOCUMENTS

| | | |
|---|---|---|
| 2001/0044278 A1 | 11/2001 | Chiao et al. |
| 2007/0168841 A1 | 7/2007 | Lakkis |
| 2009/0110031 A1 | 4/2009 | Lakkis |
| 2009/0135788 A1 | 5/2009 | Zuniga et al. |
| 2010/0054223 A1 | 3/2010 | Zhang et al. |
| 2011/0110454 A1* | 5/2011 | Sampath ............... H04L 1/0028 375/295 |
| 2011/0209035 A1 | 8/2011 | Lakkis |
| 2012/0214403 A1 | 8/2012 | Shany et al. |
| 2014/0206279 A1 | 7/2014 | Immendorf et al. |
| 2015/0043522 A1* | 2/2015 | Mobasher ............ H04B 7/0452 370/330 |
| 2015/0237178 A1 | 8/2015 | Zhang |
| 2016/0241425 A1 | 8/2016 | Xin et al. |
| 2016/0308635 A1 | 10/2016 | Zhou et al. |
| 2016/0381565 A1 | 12/2016 | Oteri et al. |

OTHER PUBLICATIONS

PCT/US2016/067861; Written Opinion of the International Searching Authority, dated Mar. 30, 2017.

U.S. Appl. No. 15/248,297; Response to Office Action dated May 7, 2018.

U.S. Appl. No. 15/382,685; Response to Office Action dated May 2, 2018.

\* cited by examiner

Table 1210

| Assignment | Total Links | Links with 1 EW Interferer | Links with 2+ EW Interferer | Links with 3+ EW Interferer |
|---|---|---|---|---|
| standard 11ad | 2360 | 134 | 62 | 1 |

Table 1220    2 Golay Codes

| Assignment | Total Links | Links with 1 EW Interferer | Links with 2+ EW Interferer | Links with 3+ EW Interferer |
|---|---|---|---|---|
| Link-based | 2360 | 65 | 1 | 0 |
| Node-based | 2360 | 65 | 4 | 0 |

Table 1230    3 Golay Codes

| Assignment | Total Links | Links with 1 EW Interferer | Links with 2+ EW Interferer | Links with 3+ EW Interferer |
|---|---|---|---|---|
| Link-based | 2360 | 18 | 0 | 0 |
| Node-based | 2360 | 21 | 1 | 0 |

Table 1240    4 Golay Codes

| Assignment | Total Links | Links with 1 EW Interferer | Links with 2+ EW Interferer | Links with 3+ EW Interferer |
|---|---|---|---|---|
| Link-based | 2360 | 17 | 1 | 0 |
| Node-based | 2360 | 17 | 1 | 0 |

FIGURE 12

CODE ASSIGNMENT

RELATED APPLICATIONS

This patent application claims priority to U.S. Provisional Patent Application Ser. No. 62/273,993 filed Dec. 31, 2015, which is herein incorporated by reference.

FIELD OF THE DESCRIBED EMBODIMENTS

The described embodiments relate generally to wireless communications. More particularly, the described embodiments relate to systems, methods and apparatuses for assigning codes to sectors of a wireless network.

BACKGROUND

Transmission and reception of communication packets between a node and another node of a wireless network can cause interfere with communication of other packets of between other nodes of the wireless network. Further, when many nodes of the wireless network transmit similarly constructed packets, the wireless network can be particularly susceptible to the effects of interference.

It is desirable to have methods apparatuses, and systems for assigning codes to sectors of nodes of a wireless network.

SUMMARY

An embodiment includes a method. The method includes selecting a plurality of available codes, grouping links of a wireless network into a plurality of groups based on connectivity of the links between sectors of the wireless network, characterizing interference between at least one link of a first group of the plurality of groups and at least one link of a second group of the plurality of groups, and assigning at least one code of the plurality of available codes to the first group and at least one other code of the plurality of available codes to the second group based on the characterizing of the interference.

Another embodiment includes a system. The system includes a plurality of sectors and a central controller that is interfaced with the plurality of sectors. The central controller is operative to select a plurality of available codes, group links of a wireless network into a plurality of groups based on connectivity of the links between the plurality of sectors of the wireless network, characterize interference between at least one link of a first group of the plurality of groups and at least one link of a second group of the plurality of groups, and assign at least one code of the plurality of available codes to the first group and at least one other code of the plurality of available codes to the second group based on the characterizing of the interference.

Another embodiment includes a central controller. The central controller is operative to select a plurality of available codes, group links of a wireless network into a plurality of groups based on connectivity of the links between the plurality of sectors of the wireless network, characterize interference between at least one link of a first group of the plurality of groups and at least one link of a second group of the plurality of groups, and assign at least one code of the plurality of available codes to the first group and at least one other code of the plurality of available codes to the second group based on the characterizing of the interference.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 12 shows test results of packet interference within a wireless network for different reference code selections, according to an embodiment.

DETAILED DESCRIPTION

The embodiments described include methods, apparatuses, and systems for assigning codes to sectors of a wireless network. For at least some embodiments, a plurality of available codes is selected. Further, links of the wireless network are group into a plurality of groups based on connectivity of the links between sectors of the wireless network. Further, interference between at least one link of a first group of the plurality of groups and at least one link of a second group of the plurality of groups is characterized. For an embodiment, at least one code of the plurality of available codes is assigned to the first group and at least one other code of the plurality of available codes to the second group based on the characterizing of the interference.

Figure 1A:
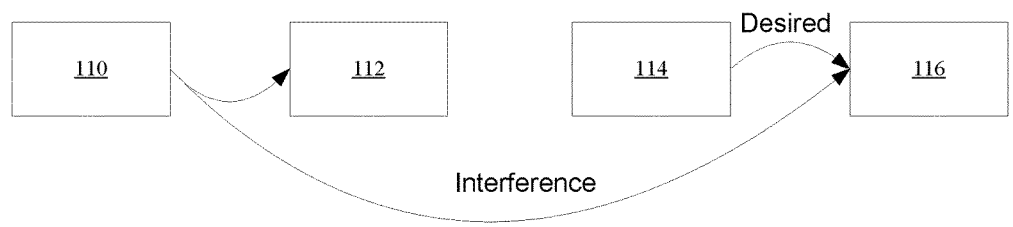
FIGS. 1A, 1B, 1C shows node configurations that can result in packet interference between links of a wireless network, according to some embodiments.
Figure 1B:
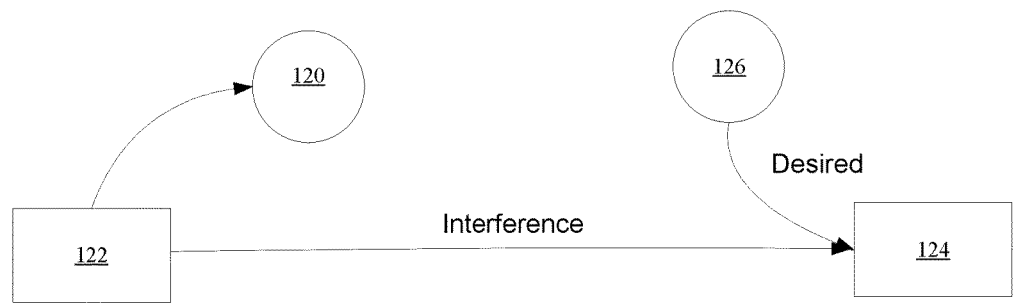
Figure 1C:
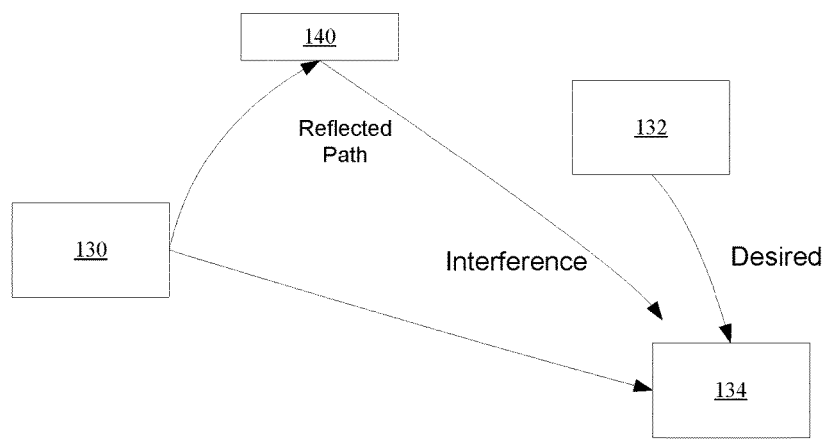

FIGS. 1A, 1B, 1C shows node configurations of a wireless network that can result in packet interference between links of the wireless network, according to some embodiments. FIG. 1A shows wireless nodes 110, 112, 114, 116 of the wireless network. Wireless node 110 may be wirelessly communicating with node 112. However, due to proximity or other factors, this wireless communication may cause interference with reception at node 116. That is, node 116 may be receiving wireless communication from node 114, but the wireless communication between node 110 and node 112 may interfere with the reception of the wireless communication by node 116.

FIG. 1B shows node 122 wirelessly communicating with client node 120. Further, client node 126 is communicating with node 124. However, the wireless communication between node 122 and client node 120 may interfere with the communication between client node 126 and node 124.

FIG. 1C shows a node 130 wirelessly communicating with a first sector of node 134, and node 132 wirelessly communicating with a second sector of node 134. For at least some embodiments, a node includes multiple sectors, wherein each sector includes at least a transceiver. However, the communication signal emanating from node 130 may reflect off of a reflector 140 and be redirected to interfere with the wireless communication between the node 132 and the second sector of node 134

As shown, due to the large number of proximate wireless links, multipoint, multi-hop wireless networks are susceptible to interference between links of the wireless network. That is, wireless communication of one link between nodes of the wireless network can interfere with the wireless communication of one or more other link between other nodes of the wireless network.

Figure 2:
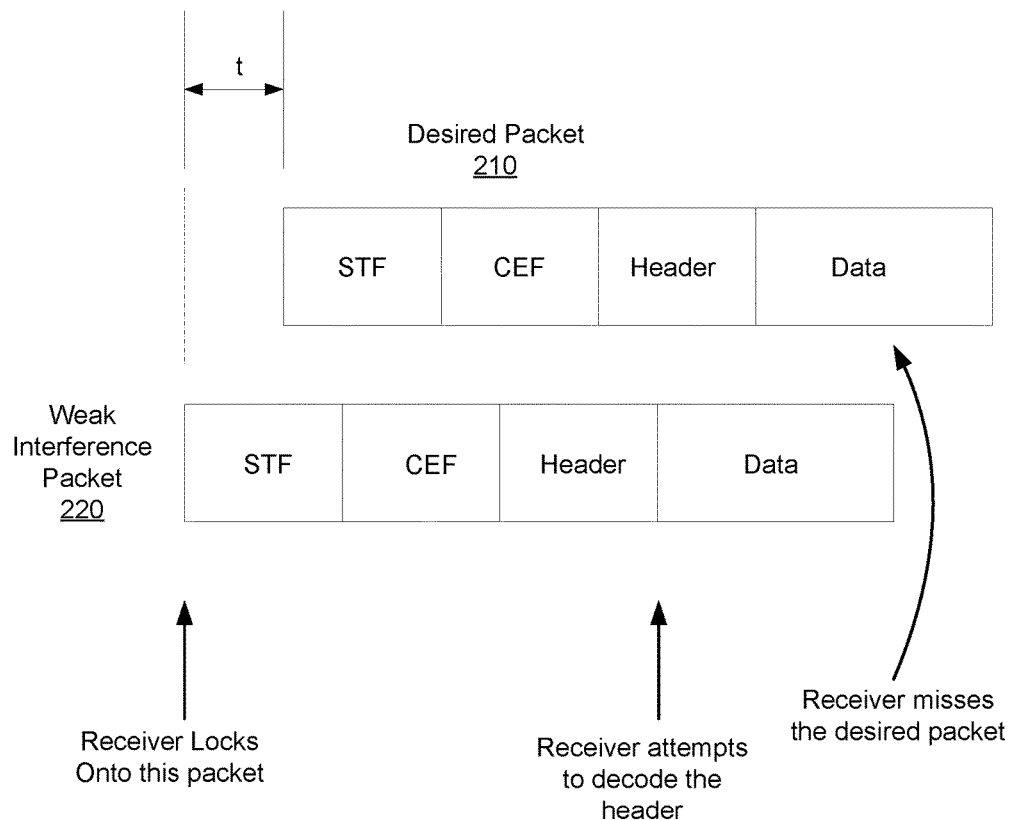
FIG. 2 shows a desired packet and an interfering packet, according to an embodiment.

FIG. 2 shows a desired packet 210 and an interfering packet 220, according to an embodiment. As shown, a receiver of a node of the wireless network can receive an interfering packet 220 before receiving a desired packet 210. The desired packet is an intended or desired packet of wireless communication over a link between the node and a transmitting node. However, due to the existence of other nodes of the wireless network, the node may also receive the interfering packet 220 a time t before receiving the desired packet 210.

The interfering packet 220 is generated by another node of the wireless network. Therefore, the interfering packet may be commonly constructed. For example, for an embodiment, one or more packets of the wireless network include a preamble that includes a short training field (STF) and a channel estimation (CE) field. Further, for an embodiment, the one or more packets further include a header and data.

Upon receiving the interfering packet 220 (also referred to as early weak interference) the receiver of the node may attempt to lock onto the early weak interference packet 220. That is, the early weak interference packet 220 may be similarly constructed as the desired packet 210, but the early weak interference packet 220 is received by the node a time t before receiving the desired packet 210. Therefore, the receiver of the node may misinterpret the early weak interference packet 220 as the desired packet 210, and attempt to lock onto the packet in order to receive and decode the packet. That is, for at least some embodiments, a receiving sector of a node uses the STF to detect the presence of a packet, and thereafter starts the remainder of the packet acquisition process. If the node inadvertently uses the STF of the weak interference signal to detect the presence of the packet, the node may start the remainder of the acquisition process. However, the early weak interference packet 220 is not the desired packet, and while the receiver of the node is attempting to lock onto and decode the early weak interference packet 220, the desired packet may be missed. Clearly this is undesirable.

Figure 3:
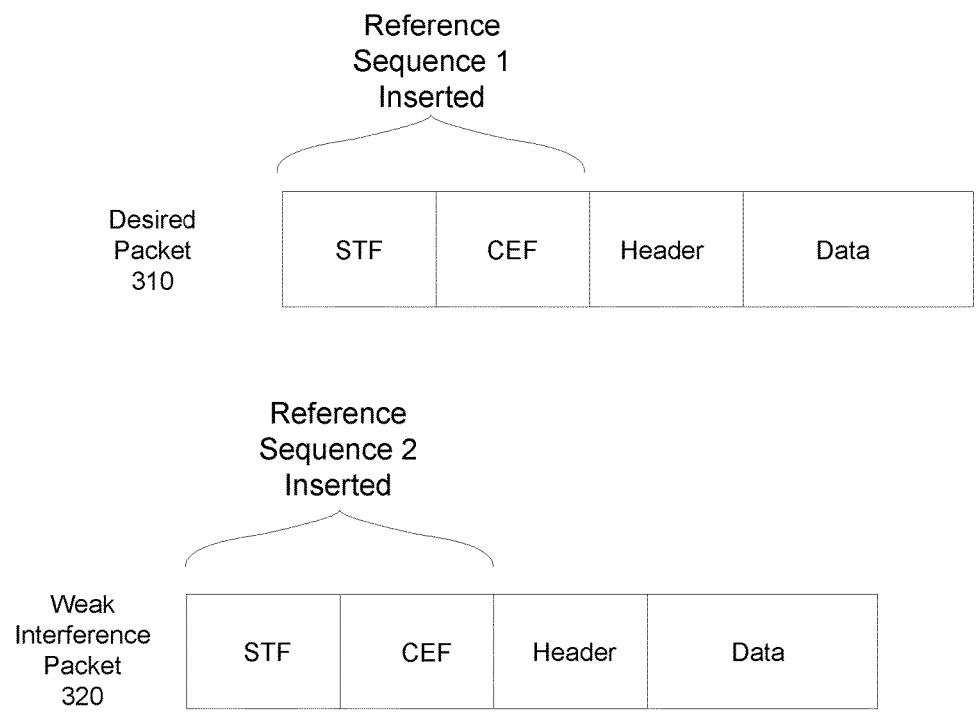
FIG. 3 shows a desired packet and an interfering packet, wherein each packet includes a different reference sequence, according to an embodiment.

FIG. 3 shows a desired packet 310 and an interfering packet 320, wherein each packet includes a different reference sequence, according to an embodiment. For at least some embodiments, a transmitting sector of a transmitting node inserts a reference sequence into at least a portion of the preamble of a packet to be transmitted. For at least some embodiments, the reference sequence is a specific reference sequence that is associated with a specific link. That is, for example, the specific link between the transmitting node and the node receiving the desired packet 310 has an associated reference sequence that the transmitting node inserts into at least a portion of the preamble of the desired packet 310. The node receiving the desired packet is able to identify the specific reference sequence for the specific link between the transmitter and the node, and the node uses this specific reference sequence to correlate the at least a portion of the preamble with the reference sequence that is selected based on the specific wireless link. The receiving nodes may start the remainder of the acquisition process.

For an embodiment, the transmitter of the weak signal interference packet 320 also inserts a different reference sequence into the preamble of the interfering packet 320. The reference sequences of the packets of interfering links are selected to be uncorrelated with the reference sequence of the desired packet of the specific link. Therefore, the node will not "lock on to" (that is, begin and continue processing) the undesired interfering packet 320 because the reference sequence of the interfering packet 320 is uncorrelated with the specific reference sequence associated with the specific link. Further, the receiving node will not begin the packet acquisition process when receiving the interfering packet 320, but rather, start the packet acquisition process upon receiving the desired packet 310.

Figure 4:
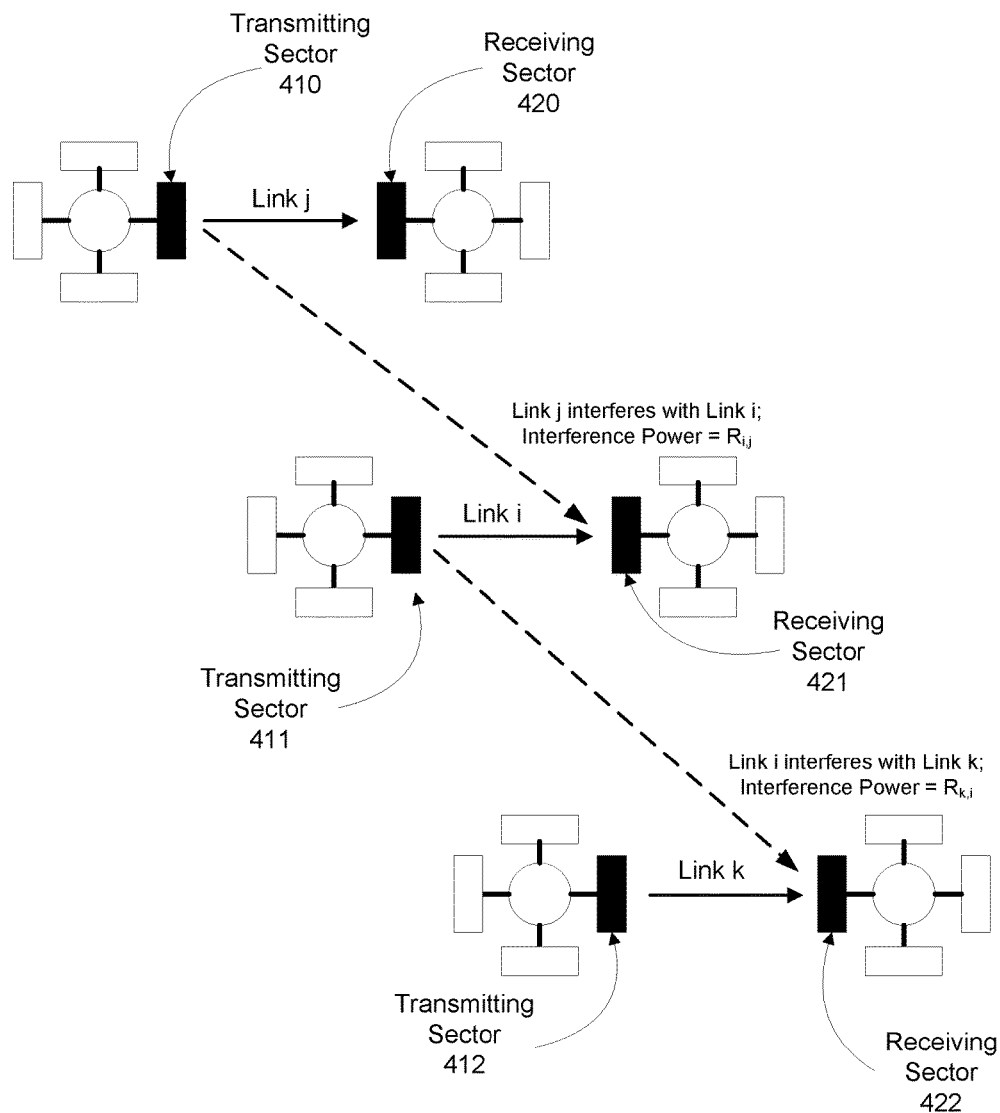
FIG. 4 shows multiple links between transmitting and receiving nodes, and further shows interference between different links, according to an embodiment.

FIG. 4 shows multiple links between transmitting and receiving nodes, and further shows interference between different links, according to an embodiment. At least some embodiments include identifying links of the wireless network that interfere with other wireless links of the wireless network. At least some embodiments include identifying groups of links of the wireless network that interfere with other groups wireless links of the wireless network.

As shown, a link j is formed between a transmitting sector 410 and a receiving sector 420. Further, a link i is formed between a transmitting sector 411 and a receiving sector 421. Further, a link k is formed between a transmitting sector 412 and a receiving sector 422.

Due to the proximity and relative physical locations of each of the sectors and the links formed between the sectors, at least some of the links will cause interference within other links. The interference can be further influences by reflectors that vary the direction of travel of the wireless communication of the links, and by variations in the directivity of beams formed by multiple antennas of at least some embodiments of the sectors.

For example, the link j may cause at least some interference with the link i which can be represented by an indicator of the interference power $R_{ji}$. Further, the link i may cause at least some interference with the link k which can be represented by an indicator of the interference power $R_{ik}$.

For at least some embodiment, the interfering packets of these interfering link have reference sequences inserted into at least a portion of the preambles of the interfering packets to prevent receivers of victim links (wireless links that suffer from interference due to the interfering links) from attempting to lock onto the interfering packets of the interfering links.

Grouping of Links

Figure 5:
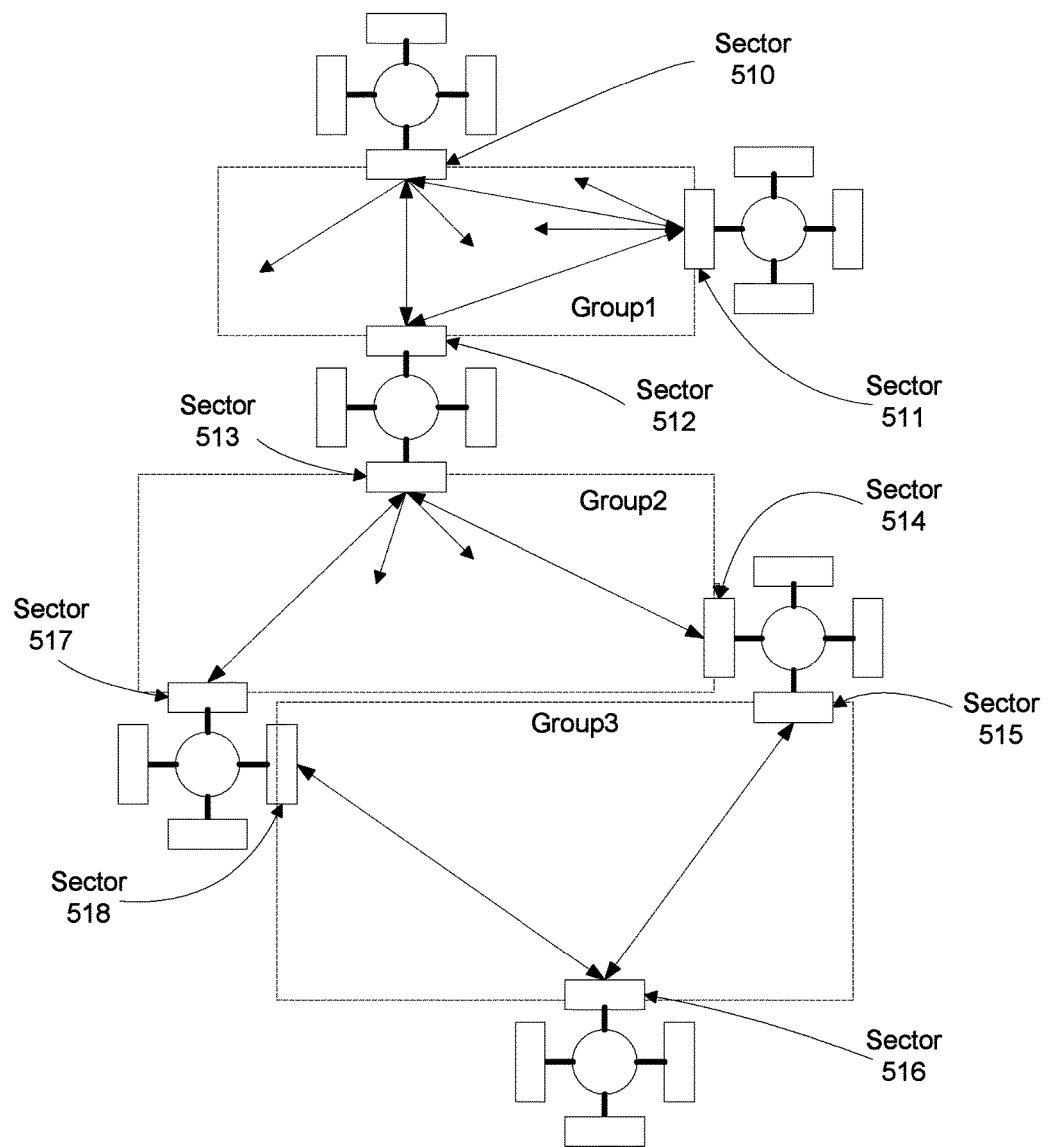
FIG. 5 shows groupings of links, according to an embodiment.

FIG. 5 shows groupings of links, according to an embodiment. As previously described, the effects of packet interference can be mitigated by inserting a different reference sequence into the preamble of the packet communicated through each different link. That is, for an embodiment, each group includes a single link. However, the number of possible reference sequences can be limited, and processing overhead is increased as the number of different reference sequences is increased. Accordingly, for an embodiment, the links are grouped. Once the links are grouped, a group that is determined to include one or more links that interfere with one or more links of another group is assigned a code (reference sequence) that is different, and uncorrelated with the reference sequence of the other group. Sectors associated with the one of more links of a group are assigned the reference sequence selected for the group. The sectors then use the assigned code for packets communication over the specific one or more links of the associated group. For an embodiment, a single code (reference sequence) is used for both transmission and reception of packets by a sector. For an embodiment, a first code (reference sequence) is used for transmission of packets by a sector, and a second code (reference sequence) is used for reception of packets by the sector.

For an embodiment, grouping links of a wireless network into a plurality of groups is based on a connectivity of the links between sectors of the wireless network.

FIG. 5 shows groupings of links, according to an embodiment. A first group (Group1) includes links formed between sectors 510, 511, 513. The sectors are each a part of different nodes of the wireless network and include two-way (transmit and receive) communication.

For an embodiment, the links are grouped by the wireless connectivity between communicating sectors. For example, sectors 510, 511, 512 are directly connected (that is, there is a single wireless hop between any two of these sectors), and form a first group (Group1).

A second group (Group2) includes sectors 513, 514, 517 due to the direct connectivity of these sectors. A third group (Group3) includes sectors 515, 516, 518 due to the direct connectivity of these sectors.

As will be described, if one or more of the links of one group interfere with one or more links of another group, the two groups are assigned different codes (reference sequences) to mitigate interferences between links of the two groups.

Figure 6:
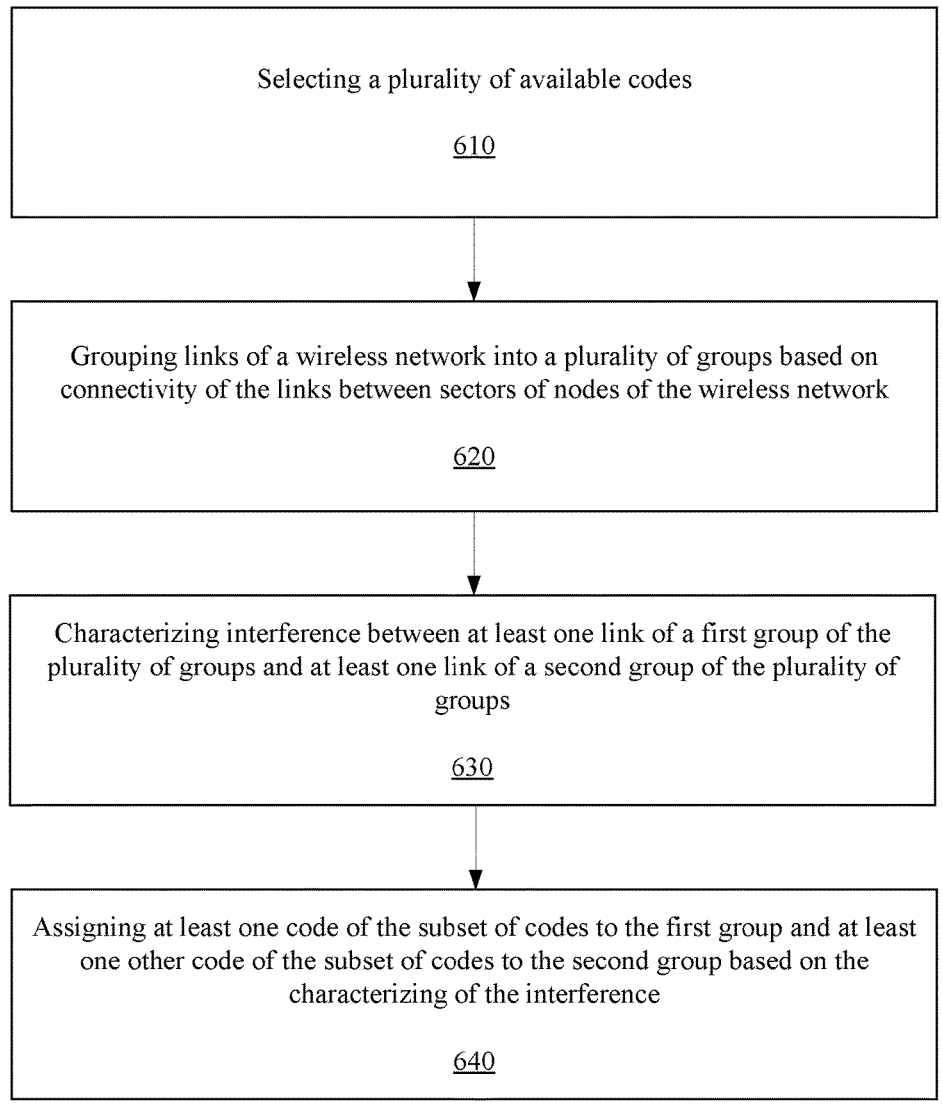
FIG. 6 is a flow chart that includes steps of a method of selecting codes for groups of links, according to an embodiment.

FIG. 6 is a flow chart that includes steps of a method of selecting codes for groups of links, according to an embodiment. A first step 610 includes selecting a plurality of available codes, which can include selecting a subset of codes from available codes. That is, a set number of say 128 codes may be available. However, for an embodiment, the number of codes may be limited to ensure a level of correlation between each of the codes that is below a desired threshold. The less correlated the codes, the less likely that a sector assigned one code will be inadvertently receive and attempt to decode a packet having another code. For an embodiment, the codes include a complex valued constituent base sequence. For an embodiment, the codes include complementary sequences or codes. For an embodiment, the codes include Golay codes. For an embodiment, the codes include a pseudo random sequences or codes. For an embodiment, the codes include a random complex sequence.

A second step 620 includes grouping links of a wireless network into a plurality of groups based on connectivity of the links between sectors of the wireless network. The connectivity of links can be used to select the different groups of links. A link includes a transmitting sector and a receiving sector. For an embodiment, a link includes a pair-wise connection between two sectors.

A third step 630 includes characterizing interference between at least one link of a first group of the plurality of groups and at least one link of a second group of the plurality of groups. For an embodiment, the characterizing interference between at least one link of a first group of the plurality of groups and at least one link of a second group of the plurality of groups includes measuring the interference. For example, one sector associated with at least one of the links of one group can measure a level of interference received from another sector associated with at least one of the links of one other group. Each sector includes a transceiver which receives wireless signals. The level of interference of the received wireless signals can be measured. For an embodiment, the measured level of interference is compared to one or more thresholds that provide an indication of interference between the one group and the other group. That is, an indicator indicates interference between the groups if the measured interferences has a value that is above a threshold.

For an embodiment, the characterizing interference between at least one link of a first group of the plurality of groups and at least one link of a second group of the plurality of groups includes predicting interference between links or groups of links based on modeling or simulation of the wireless network. For an embodiment, the characterizing utilizes a topology of the wireless network. For an embodiment, the characterizing uses physical distance between links or nodes for characterizing or estimating interference between the links or groups of links. At least some embodiments utilize previously determined information of interference between links. Further, the characterizing may utilize information of other parameters that influence propagation of interference signals, such as other data such, humidity etc.

For an embodiment, the characterizing interference between at least one link of a first group of the plurality of groups and at least one link of a second group of the plurality of groups includes a random assignment of a code to a group of links. That is, the coding assigned to each group can be randomly assigned, whether or not any measurements or predictions are made. Even assuming a random relationship of the interference between the groups and assigning codes provides benefits over not assigning the coding to groups of links.

A fourth step 640 includes assigning at least one code of the subset of codes to the first group and at least one other code of the subset of codes to the second group based on the characterizing of the interference. For an embodiment, a first code is assigned to the first group and a second code is assigned to the second group. For an embodiment, the first code and the second code are identified or selected by an indicator of a level of correlation between the codes.

For at least some embodiments, a first sector associated with a first specific link that is within the first group configures packets for transmission using the first code, and a second sector associated with a second specific link that is within the second group configures packets for transmission using the second code. For an embodiment, configuring the packets for transmission includes identifying an assigned code (reference sequence) based on that group that the specific wireless link is within, and inserting the assigned code (reference sequence) into at least a portion of the preamble. The sector then transmits the configured packet over the specific wireless link. That is, the first sector inserts the first code into at least a portion of the preamble of packets for transmission over the first specific link, and the second sector inserts the second code into at least a portion of the preamble of packets for transmission over the second specific link.

For an embodiment, the assignment of codes to groups of links is performed while the wireless network is being designed or deployed. That is, the code selections, the grouping of the links of the wireless network, characterizing the interferences between groups, and the code assignments are performed before deployment. These processes may be performed, for example, by a network floor planning process.

For an embodiment, the assignment of codes to groups of links is performed when the wireless network is modified. That is, at least one of the code selections, the grouping of the links of the wireless network, characterizing the interferences between groups, or the code assignments are performed as new sectors are added to the wireless network.

For an embodiment, the assignment of codes to groups of links is performed periodically while the wireless network is in steady state operation. That is, at least one of the code selections, the grouping of the links of the wireless network, characterizing the interferences between groups, or the code assignments are performed periodically while the wireless network is in steady state operation.

For an embodiment, the assignment of codes to groups of links is adaptively performed while the wireless network is in steady state operation. That is, at least one of the code selections, the grouping of the links of the wireless network, characterizing the interferences between groups, or the code assignments are adaptively performed while the wireless network is in steady state operation. For example, if performance of the wireless network is sensed to be decreasing, the network can adaptively repeat at least some of the steps of the assignment of codes to groups of links.

For an embodiment, the assignment of codes to groups of links is performed manually. That is, at least one of the code selections, the grouping of the links of the wireless network, characterizing the interferences between groups, or the code assignments are triggered based on actions of a network operator.

The characterizing of the interference between the links of the first group and the links of the second group provides for identification of at least some interference between the links of the first group and links of the second group. Accordingly, codes are assigned to the first group and the second group in order to mitigate interference (for example, the early weak signal interference) of packets communicated over one or more of links of the first group with packets communicated over one or more of the links of the second group.

For at least some embodiments, the sectors include multiple antenna elements. Therefore, the sectors can form beam during transmission and reception of wireless communication signals. Due to the focusing and concentration of beams, transmission and reception is improved, and self-interference within the wireless network is reduced as the energy of the wireless communication signals is focused in the beam forming direction.

At least some embodiments include assigning different codes to each group of pairs of groups of the plurality of groups based on interference between at least one link of one group of a pair of groups and at least one link of another group of the pair of groups. For an embodiment, different codes assigned to each group when interference between groups is greater than a threshold.

For an embodiment, each group comprises a single link. That is, each link of the wireless network is identified as a separate group and each link is assigned a different code. In some wireless networks that include many links, this may be onerous and processing intensive.

For an embodiment, a link is defined in part by a direction of the connection between a transmitting sector and a receiving sector. That is, for an embodiment, one or more links of the wireless network are unidirectional. That is, each direction of wireless communication between sectors of the wireless network may comprise an individual link. Accordingly, for an embodiment, wireless communication between two sectors in a first direction is a first link, and wireless communication between the two sectors in a second direction is a second link. Further, the first link and the second link can be included within separate groups.

For an embodiment, each group includes one or more links. The number of code assignments can be reduced by grouping multiple links. Since a code is assigned to each group, multiple links are assigned same code.

At least some embodiments include configuring one or more sectors associated with the one or more links of each of the plurality of groups with the assigned at least one of the subset of codes. As previously described, each link forms a wireless connection between two sectors of the wireless network. Further, links of a group are assigned a code. The sectors of each link code and decode packets communicated through the link with the code (reference sequence) assigned to the link between the sectors. For an embodiment, the sectors are configured with the assigned codes. For an embodiment, configuring the sectors includes providing the each sector with a configuration parameter list, wherein the configuration parameter list includes the at least one of the subset of codes assigned to the grouped links of the node.

For an embodiment, each sector is assigned a single code for both reception and transmission. This can simplify processing because the sector does not need to update the code the sector is using to code packet or decode packets.

For an embodiment, each sector is assigned at least one code for reception and at least one code for transmission. For at least some embodiments, a node of the wireless network includes multiple sectors. If the sectors are communicating over a common channel, assigning one code for reception and one code for transmission helps to minimize interference between sectors. Further, as previously described, at least some links are defined as unidirectional. Therefore, for at least some embodiments, different codes can be assigned to links that include communication in different directions. Accordingly, a sector may be associated with one group when transmitting packets and with another group when receiving packets.

Due to the grouping and code assignments, within a particular group, one sector may have an assigned code for transmission while another sector (e.g., a "reciprocal sector") will have the same assigned code for reception. These assigned codes can stay the same, or change (if the link directions are grouped differently) when the roles are reversed and one sector is receiving and the reciprocal sector is transmitting.

Code Selection

For a given system, there are multiple codes available for selection. For an embodiment, selecting the subset of the available codes includes selecting few enough codes to provide correlation between each of the codes of the subset of codes of less than a threshold. That is, if too many codes are selected for assignment, the correlation between any two of the selected codes may not be great enough to allow a receiving node to properly distinguish between a desired packet and an interfering packet.

Further, at least some embodiments include at least a minimum number of codes. For at least some embodiments, a code is assigned to each of the identified groups. In order to minimize interference between the groups, a minimum number of possible codes for assignment may be desired.

At least some embodiments include selecting specific codes of the subset of codes based on a capability or a characteristic of a receiver of at least one sector of the nodes. That is, the sectors can include different types of receivers that include different capabilities or characteristics. For an embodiment, the receiver type is identified during ignition (for example, during deployment of the wireless network). For an embodiment, the receiver type is identified and characterized during design or initial simulation and testing. For at least some embodiments, different receiver types react differently to different types of reference sequences. For an embodiment, different receiver types include different packet acquisition algorithms.

For at least some embodiments, the receiver characteristics which are predicted, observed, or measured, are provided with the reference sequence which is selected based at least in part on the receiver characteristics. For an exemplary embodiment, the reference sequences are selected by feeding Golay sets into a standard (IEEE 802.11ad) Golay generator. The Golays sets in of Table 1 contain the sequence indices of the respective Golay sequences. The sequence is generated by using the binary representation of the index as input (W matrix) to the standard 11ad Golay generator. Note that index 5 represents the default Golay used in the 11ad standard.

TABLE 1

| Golay Set |
| --- |
| Size = 2 {5, 69} |
| Size = 3 {5, 59, 128} |
| Size = 4 {5, 59, 128, 66} |
| Size = 5 {5, 59, 128, 66, 1} |

As previously described, for at least some embodiments, grouping links of the wireless network is based on connectivity of the links between sectors of nodes of the wireless network is based upon a topology of the wireless network. For at least some embodiments, grouping links of the wireless network based on connectivity of the links between sectors of nodes of the wireless network includes identifying one or more links between sectors of the wireless network, and grouping the one or more links.

Characterizing Interference

For at least some embodiments, characterizing the interference includes generating an interference matrix wherein each entry of the interference matrix includes at least one indicator of interference of an ith group on a jth group. More specifically, for an embodiment, characterizing the interference includes generating an interference matrix wherein each entry of the interference matrix includes the at least one indicator of interference of an ith group on a jth group of the wireless network. Once created, the interference matrix provides a convenient vehicle for identifying interferences between groups of links of the wireless network.

Alternatively, for at least some embodiments, characterizing the interference includes generating an interference matrix wherein each entry of the interference matrix includes at least one indicator of interference of an ith link on a jth link. More specifically, for an embodiment, characterizing the interference includes generating an interference matrix wherein each entry of the interference matrix includes the at least one indicator of interference of an ith link on a jth link of the wireless network. Once created, this interference matrix provides a convenient vehicle for identifying interference between links of the wireless network.

As previously described, for at least some embodiments, characterizing interference between at least one link of a first group of the plurality of groups and at least one link of a second group of the plurality of groups includes predicting interference of one or more links of the first group with one or more links of a second group based on simulation and/or testing of network pre-planning.

For at least some embodiments, characterizing interference between at least one link of a first group of the plurality of groups and at least one link of a second group of the plurality of groups includes sensing interference of one or more links of the first group with one or more links of a second group. For an embodiment, interference between links of groups is indicated if the sensed interference is greater than a threshold. For an embodiment, the interference between groups is sensed over time, allowing for adaptive updates to the code assignments. That is, over time different groups of links may cause interferences to be sensed by other different groups. Accordingly, the code assignment for the links can be updated as interference between the groups is sensed.

For at least some embodiments, characterizing interference between at least one link of a first group of the plurality of groups and at least one link of a second group of the plurality of groups includes characterizing interference of a first number of links of the first group with a second number of links of a second group. That is, interferences is indicated if the first number links of the first group are determined to be interfering with the second number of links of the second group.

Code Assignment

As previously stated, for an embodiment, different groups are assigned different codes. Further, for an embodiment, groups that interfere with each other are assigned codes based on level of correlation between the available codes. That is, it is desirable to assign codes that are the least (or below threshold) correlated to the groups that interfere with each other.

For an embodiment, due to the finite number of available codes, different groups are assigned the same codes. That is, if there are large enough number of groups, all of the available codes can be used up during assignment to the groups, and at least some codes will have to be reused with multiple groups. Ideally, groups assigned the same code do not have any interference with each other. However, if there is some interference between groups an all available codes have been used, the codes are reused based on the correlation between the available codes and the level of interference between the groups being assigned.

As will be described later, at least some embodiments further include receiving, by a sector of the wireless network, data to be transmitted over a specific wireless link of the wireless network, wherein the specific wireless link belongs to one of the first group or the second group. A packet for transmission over the specific wireless link is configured, wherein the packet includes a preamble and the data. For an embodiment, configuring the packet includes obtaining a reference sequence based on the assigned at least one of the subset of codes of the first group or second group of the specific wireless link, and inserting the reference sequence into at least a portion of the preamble. Finally, the configured packet is transmitted over the wireless link.

Figure 7:
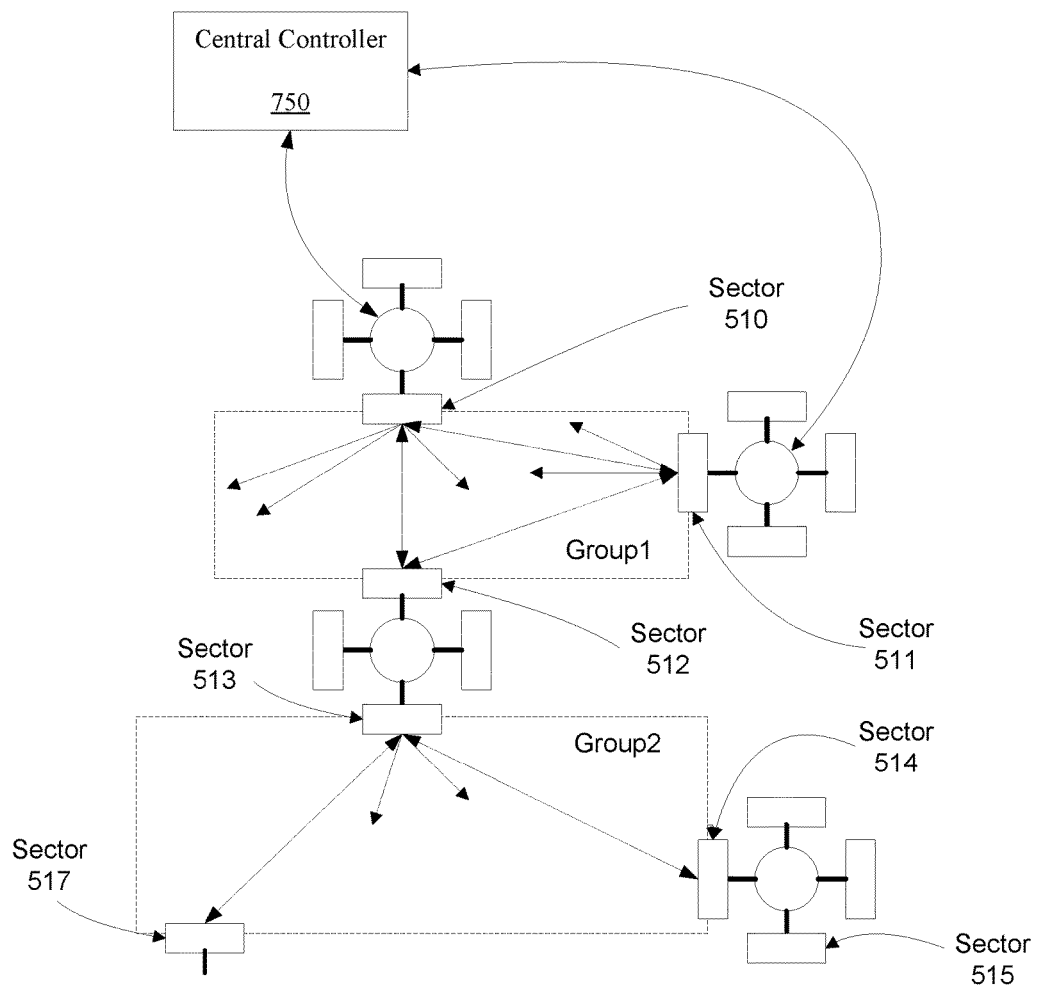
FIG. 7 is a block diagram of a wireless network, according to an embodiment.

FIG. 7 is a block diagram of a wireless network, according to an embodiment. As shown the wireless network includes multiple nodes 712, 714, 716, 718 and a central controller 750. Further, one or more of the nodes 712, 714, 716, 718 include multiple sectors, such as sectors 510, 511, 512, 513, 514, 515, 516, 517. As shown, the central control 750 is connected to at least one of the nodes 712, 714.

For at least some embodiments, one or more of the steps of selecting a subset of codes from available codes, grouping links of a wireless network into a plurality of groups based on connectivity of the links between sectors of the wireless network, characterizing interference between at least one link of a first group of the plurality of groups and at least one link of a second group of the plurality of groups, or assigning at least one code of the subset of codes to the first group and at least one other code of the subset of codes to the second group based on the characterizing of the interference, occurs at the central server. For at least some embodiments, one or more of the steps of selecting a subset of codes from available codes, grouping links of a wireless network into a plurality of groups based on connectivity of the links between sectors of the wireless network, characterizing interference between at least one link of a first group of the plurality of groups and at least one link of a second group of the plurality of groups, or assigning at least one code of the subset of codes to the first group and at least one other code of the subset of codes to the second group based on the characterizing of the interference, occurs at one or more of the nodes or sectors of the wireless network. For at least some embodiments, at least some of the steps occur upstream from the central controller, such as, in the cloud.

Figure 8:
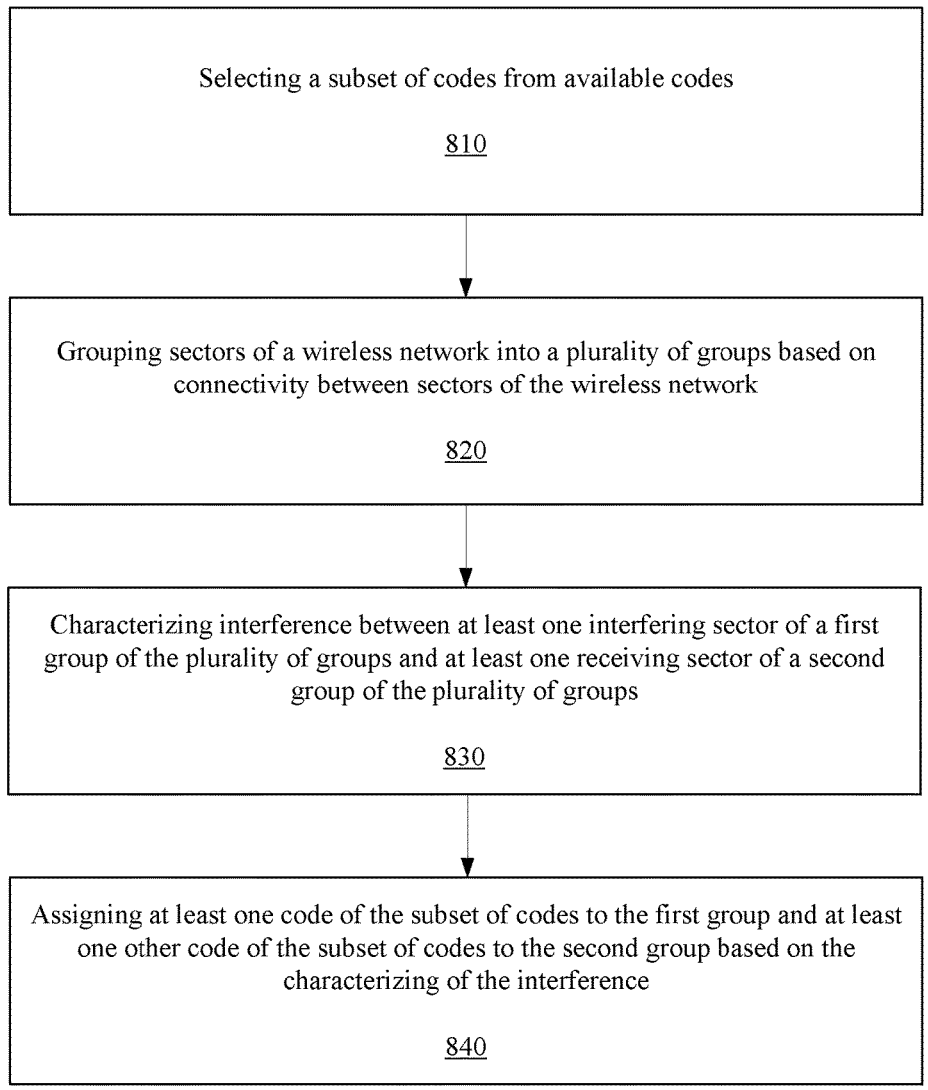
FIG. 8 is a flow chart that includes steps of a method of selecting codes for sectors of a wireless network, according to an embodiment.

FIG. 8 is a flow chart that includes steps of a method of selecting codes for sectors of a wireless network, according to an embodiment. That is, while the grouping was previously described as grouping of links, at least some embodiments include grouping of sectors. For this embodiment, a first step 810 includes selecting a subset of codes from available codes. A second step 820 includes grouping sectors of a wireless network into a plurality of groups based on connectivity between sectors of the wireless network. A third step 830 includes characterizing interference between at least one interfering sector of a first group of the plurality of groups and at least one receiving sector of a second group of the plurality of groups. A fourth step 840 includes assigning at least one code of the subset of codes to the first group and at least one other code of the subset of codes to the second group based on the characterizing of the interference.

Figure 9:
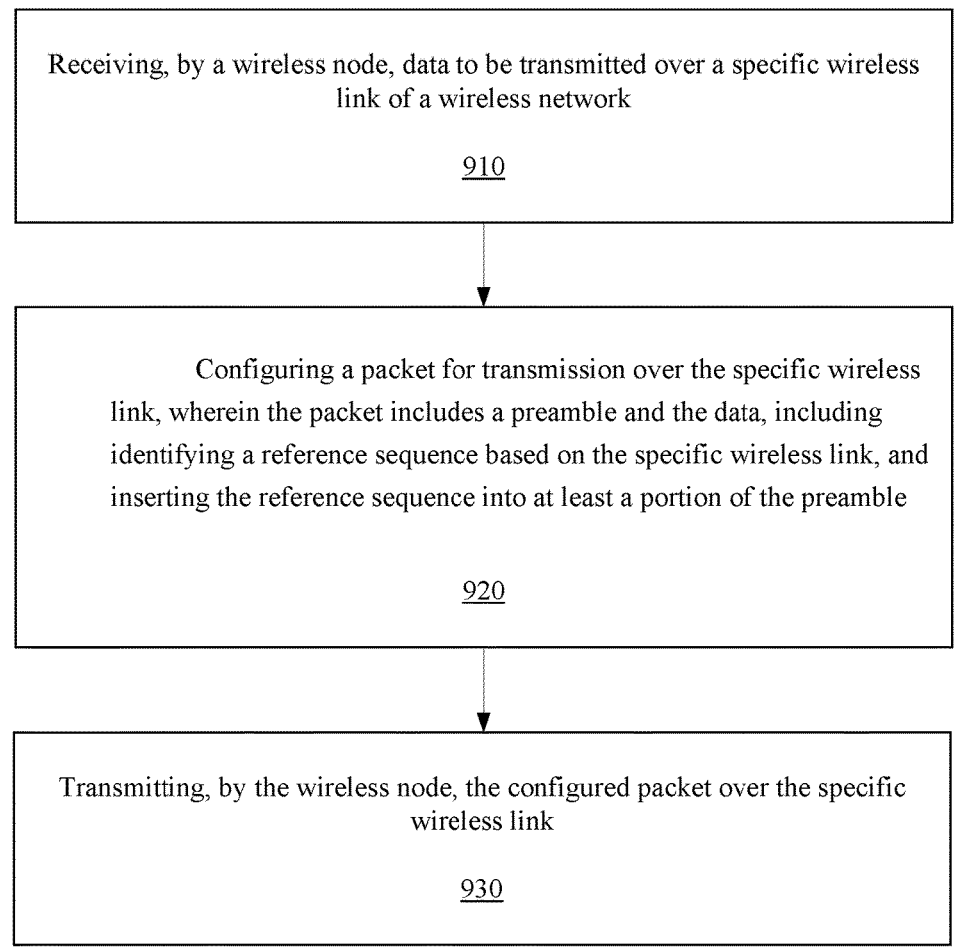
FIG. 9 is a flow chart that includes steps of a method of mitigating packet interference by inserting a reference sequence into a preamble of packets, according to an embodiment.

FIG. 9 is a flow chart that includes steps of a method of mitigating packet interference, according to an embodiment. A first step 910 includes receiving, by a sector of a wireless node, data to be transmitted over a specific wireless link of a wireless network. For at least some embodiments, the wireless node includes a plurality of sectors. Any given sector may receive data for transmission through a specific link from another sector, or through a hardwire connection to the wireless node. For an embodiment, a link is defined as a wireless link between a wireless transmitting sector and a wireless receiving sector.

For an embodiment, the specific link includes a wireless link between two sectors of the wireless network. For an embodiment, a link (the specific link) is unidirectional. For broadcast packets, for an embodiment, a link (the specific link) is defined by a transmitter and multiple receivers.

A second step 920 includes configuring a packet for transmission over the specific wireless link, wherein the packet includes a preamble and the data. For at least some embodiments, configuring the packet includes identifying a reference sequence based on the specific wireless link, and inserting the reference sequence into at least a portion of the preamble.

For at least some embodiments, identifying the reference sequence includes a central controller performing the selection of the references sequence, and providing the reference sequence to the sectors. That is, for an embodiment, the central controller performs the identifying of the reference sequence, and the central controller provides the reference sequence to the wireless node. For an embodiment, the reference sequences are predetermined by the central controller or some other backend controller during network planning and/or deployment. The reference sequence of a particular sector can be retrieved by the sector. For an embodiment, the sector performs the identifying of the reference sequence.

For an embodiment, the sector configures packets for multiple links, and inserts a reference sequence for each of the multiple links. For an embodiment, the reference sequence for a link (the specific link) can change over time.

A third step 930 includes transmitting, by the wireless node, the configured packet over the specific wireless link.

For at least some embodiments, the references sequence includes a complex valued constituent base sequence. For an embodiment, the complex valued constituent base sequence includes a complementary sequence. For an embodiment, the complex valued constituent base sequence includes a Walsh code. For an embodiment, the complex valued constituent base sequence includes a pseudo random sequence. For an embodiment, the complex valued constituent base sequence includes a random complex sequence. For an embodiment, the complex valued constituent base sequence includes a Golay sequence.

Figure 10A:
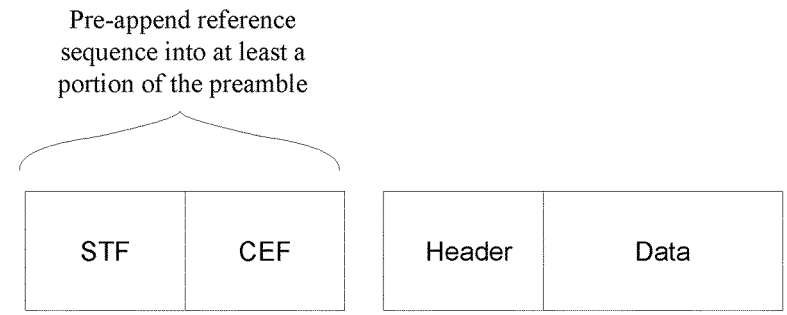
FIGS. 10A, 10B, 10C show processes for inserting reference sequences into packets, according to embodiments.
Figure 10B:
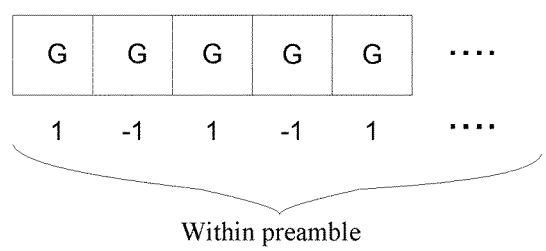
Figure 10C:
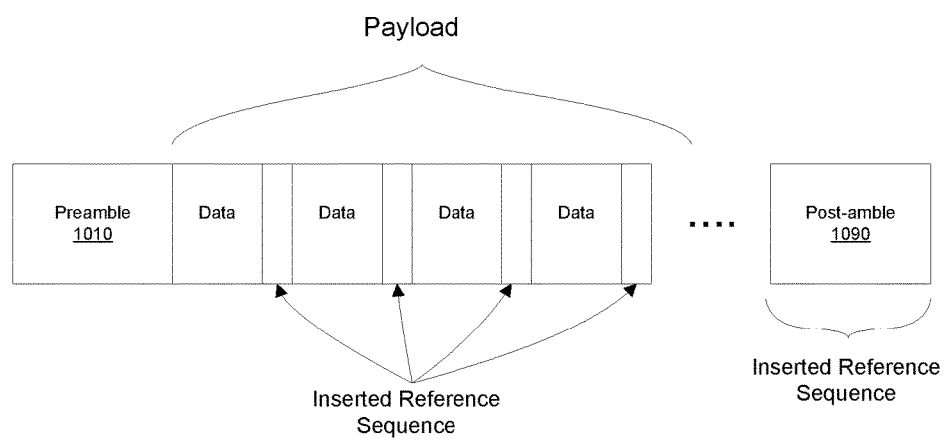

FIGS. 10A, 10B, 10C show processes for inserting reference sequences into packets, according to embodiments. FIG. 10A shows the reference sequence being inserted into at least the preamble of the packet. As shown, the packet includes an STF (short training field) and a CEF (channel estimate field). The reference sequence is inserted into at least a portion of these fields. For an embodiment, the reference sequence is pre-appended into the at least the portion of the preamble. The pre-appended reference sequence allows for a receiver to properly lock onto the packet earlier in the duration of the packet.

FIG. 10B shows a repeating of the insertion of the reference sequence within the preamble. The reference is designated with a G (Golay code). Further, for an embodiment, a phase of the reference sequence changes during the repetition of the reference sequence. For example, as shown, the phase alternates from Golay code to Golay code as indicated by the "1" and "−1". The alternating phase of the sequence as shown is merely an example. Other repeating sequences can alternatively be utilized.

FIG. 10C shows additional insertion of the reference sequence into the packet. For an embodiment, reference sequences are additionally inserted into data of a payload of the packets. Further, for an embodiment, the references sequence is additionally inserted into a post-able 1090 of the packet.

For at least some embodiments, identifying a reference sequence based on the specific wireless link includes characterizing interference between the specific link and at least one other link of the wireless network, and assigning the reference sequence to the specific link, and another sequence to the at least one other link of the wireless network. For at least some embodiments, identifying a reference sequence based on the specific wireless link, includes selecting a subset of codes from available codes, grouping links of the wireless network into a plurality of groups based on connectivity of the links between sectors of nodes of the wireless network, characterizing interference between at least one link of a first group of the plurality of groups and at least one link of a second group of the plurality of groups, wherein at least one of the first group or the second group includes the specific wireless link, assigning at least one code of the subset of codes to the first group and at least one other code of the subset of codes to the second group based on the characterizing of the interference, and configuring the sector with the references sequence, wherein the reference sequence comprises one of the subset of codes of the first group or one of the subset of codes of the second group based on which of the first group or the second group includes the specific wireless link.

Figure 11:
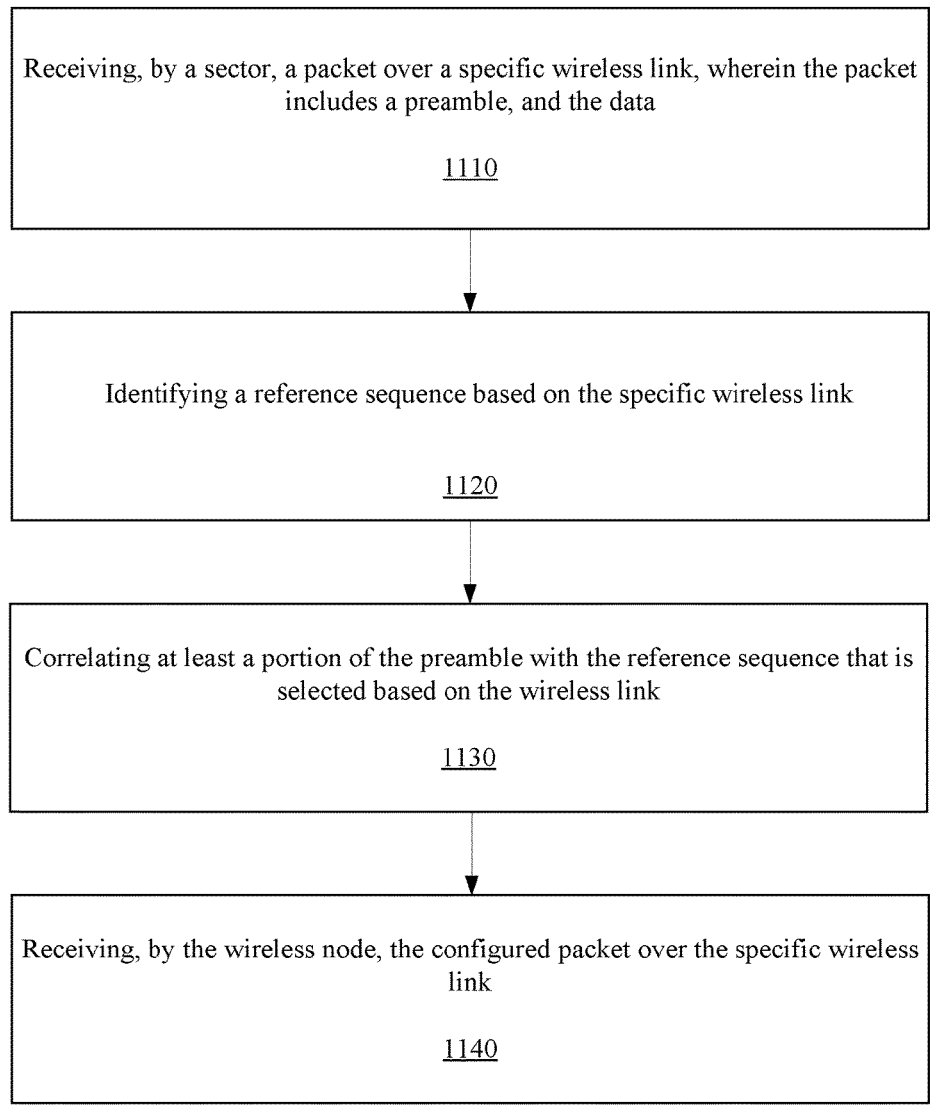
FIG. 11 is a flow chart that includes steps of a method of receiving a packet in which a reference sequence is inserted in a preamble of the packet, according to an embodiment.

FIG. 11 is a flow chart that includes steps of a method of receiving a packet in which a reference sequence is inserted in a preamble of the packet, according to an embodiment. A first step 1110 includes receiving, by a sector, a packet over a specific wireless link, wherein the packet includes a preamble, and the data. A second step 1120 includes identifying a reference sequence based on the specific wireless link. A third step 1130 includes correlating at least a portion of the preamble with the reference sequence that is selected based on the wireless link. A fourth step 1140 includes receiving, by the wireless node, the configured packet over the specific wireless link.

FIG. 12 shows test results of packet interference within a wireless network for different codes selections, according to an embodiment. A first table 1210 shows the number of early weak interferers for a sample network that has a total number of 3260 links and includes standard 801ad assignments. As depicted, the number of links with one early weak interferer is 134, the number of links with two early weak interferers is 62, and the number link with three early weak interferers is 1.

A second table 1220 shows the number of early weak interferers for the sample network that has a total number of 3260 links and includes link based and node based assignments using two Golay codes as reference sequences. As depicted, for the link-based assignments, the number of links with one early weak interferer is 65, the number of links with two early weak interferers is 1, and the number link with three early weak interferers is 0. As depicted, for the node-based assignments, the number of links with one early weak interferer is 66, the number of links with two early weak interferers is 4, and the number link with three early weak interferers is 0.

A third table 1230 shows the number of early weak interferers for the sample network that has a total number of 3260 links and includes link based and node based assignments using three Golay codes as reference sequences.

A fourth table 1240 shows the number of early weak interferers for the sample network that has a total number of 3260 links and includes link based and node based assignments using four Golay codes as reference sequences.

Although specific embodiments have been described and illustrated, the embodiments are not to be limited to the specific forms or arrangements of parts so described and illustrated. The described embodiments are to only be limited by the claims.

What is claimed:

1. A method comprising:
   interfacing a central controller with a plurality of sectors of a wireless network including at least a transmitting sector and a receiving sector, wherein a specific wireless link connects the transmitting sector and the receiving sector;
   selecting, by the central controller, a plurality of available codes;
   grouping, by the central controller, links of the wireless network into a plurality of groups based on connectivity of the links between plurality of sectors of the wireless network;
   characterizing, by the central controller, interference between at least one link of a first group of the plurality of groups and at least one link of a second group of the plurality of groups; and
   assigning, by the central controller, at least one code of the plurality of available codes to the first group and at least one other code of the plurality of available codes to the second group based on the characterizing of the interferences; and
   configuring the transmitting sector and the receiving sector with a reference sequence, wherein the reference sequence comprises one of the subset of codes of the first group or one of the subset of codes of the second group based on which of the first group or the second group includes the specific wireless link;
   transmitting, by the transmitting sector, a packet coded with the reference sequence; and
   receiving and decoding, by the receiving sector, the packet using the reference sequence, comprising correlating at least a portion of the packet with the reference sequence.

2. The method of claim 1, wherein each group comprises a single link.

3. The method of claim 1, wherein each group comprises one or more links.

4. The method of claim 1, wherein each sector of the plurality of sectors is assigned a single code for both reception and transmission.

5. The method of claim 1, wherein each sector of the plurality of sectors is assigned at least one code for reception and at least one code for transmission.

6. The method of claim 1, wherein characterizing the interference comprises generating an interference matrix wherein each entry of the interference matrix includes at least one indicator of interference of an ith group on a jth group.

7. The method of claim 1, wherein characterizing interference between at least one link of a first group of the plurality of groups and at least one link of a second group of the plurality of groups comprises:
   sensing interference of one or more links of the first group with one or more links of a second group.

8. The method of claim 1, wherein characterizing interference between at least one link of a first group of the plurality of groups and at least one link of a second group of the plurality of groups comprises:
   characterizing interference of a first number of links of the first group with a second number of links of a second group.

9. The method of claim 1, wherein the at least one code of the first group and the at least one code of the second group are assigned based on level of correlation between the available codes.

10. The method of claim 1, wherein at least one code is assigned to more than group of the plurality of groups.

11. A system comprising:
   a plurality of sectors;
   a central controller interfaced with the plurality of sectors of a wireless network including at least a transmitting sector and a receiving sector, wherein a specific wireless link connects the transmitting sector and the receiving sector, the central controller operative to:
   select a plurality of available codes;
   group links of the wireless network into a plurality of groups based on connectivity of the links between the plurality of sectors of the wireless network;

characterize interference between at least one link of a first group of the plurality of groups and at least one link of a second group of the plurality of groups; and assign at least one code of the plurality of available codes to the first group and at least one other code of the plurality of available codes to the second group based on the characterizing of the interference wherein the transmitting sector and the receiving sector are configured with a reference sequence, wherein the reference sequence comprises one of the subset of codes of the first group or one of the subset of codes of the second group based on which of the first group or the second group includes the specific wireless link; wherein the transmitting sector is operative to transmit a packet coded with the reference sequence; and wherein the receiving sector is operative to receive and decode the packet using the reference sequence, comprising correlating at least a portion of the packet with the reference sequence.

12. The system of claim 11, wherein each group comprises one or more links.

13. The system of claim 12, wherein each sector of the plurality of sectors is assigned a single code for both reception and transmission.

14. The system of claim 12, wherein each sector of the plurality of sectors is assigned at least one code for reception and at least one code for transmission.

15. The system of claim 11, wherein characterizing the interference comprises generating an interference matrix wherein each entry of the interference matrix includes at least one indicator of interference of an ith group on a jth group.

16. The system of claim 11, wherein the plurality of sectors are operative to sense interference of one or more links of the first group with one or more links of a second group, and the controller is operative to characterize the interference between at least one link of a first group of the plurality of groups and at least one link of a second group of the plurality of groups based on the sensed interference.

17. A central controller operative to:

select a plurality of available codes;

group links of a wireless network into a plurality of groups based on connectivity of the links between a plurality of sectors of the wireless network;

characterize interference between at least one link of a first group of the plurality of groups and at least one link of a second group of the plurality of groups; and assign at least one code of the plurality of available codes to the first group and at least one other code of the plurality of available codes to the second group based on the characterizing of the interference;

wherein the central controller is interfaced with the plurality of sectors of the wireless network including at least a transmitting sector and a receiving sector, wherein a specific wireless link connects the transmitting sector and the receiving sector;

wherein the transmitting sector and the receiving sector are configured with a reference sequence, wherein the reference sequence comprises one of the subset of codes of the first group or one of the subset of codes of the second group based on which of the first group or the second group includes the specific wireless link; wherein the transmitting sector is operative to transmit a packet coded with the reference sequence; and wherein the receiving sector is operative to receive and decode the packet using the reference sequence, comprising correlating at least a portion of the packet with the reference sequence.

* * * * *